United States Patent [19]
Thill

[11] Patent Number: 5,970,645
[45] Date of Patent: Oct. 26, 1999

[54] FISH BITE INDICATOR SYSTEM

[76] Inventor: Gene R. Thill, 1002 E. 65th St. North, Sioux Falls, S. Dak. 57104

[21] Appl. No.: 09/105,441

[22] Filed: Jun. 26, 1998

[51] Int. Cl.$^6$ .................................................. A01K 97/12
[52] U.S. Cl. ................................................................ 43/17
[58] Field of Search ...................................... 43/16, 17, 25

[56] References Cited

U.S. PATENT DOCUMENTS

| | | | |
|---|---|---|---|
| 75,075 | 3/1868 | Talbots | 43/17 |
| D. 249,782 | 10/1978 | Marcus . | |
| D. 355,473 | 2/1995 | Booth | D22/148 |
| 446,596 | 2/1891 | Hackett | 43/17 |
| 479,219 | 7/1892 | Lane | 43/17 |
| 518,013 | 4/1894 | Thayer | 43/17 |
| 1,021,147 | 3/1912 | Green | 43/17 |
| 1,230,467 | 6/1917 | Ehrler | 43/17 |
| 1,264,000 | 4/1918 | Bernhardt | 43/17 |
| 1,870,782 | 8/1932 | Minutilli | 43/16 |
| 2,483,071 | 9/1949 | Stine | 43/17 |
| 2,624,972 | 1/1953 | Burg | 43/17 |
| 2,636,303 | 4/1953 | Feigley et al. | 43/17 |
| 2,642,692 | 6/1953 | Smith | 43/17 |
| 2,654,176 | 10/1953 | Kachelski et al. | 43/17 |
| 2,775,053 | 12/1956 | Knoll et al. | 43/17 |
| 2,923,082 | 2/1960 | Kulow | 43/17 |
| 2,931,122 | 4/1960 | Thordson et al. | 43/17 |
| 2,934,849 | 5/1960 | Kampa | 43/17 |
| 2,970,400 | 2/1961 | Nolin | 43/17 |
| 3,057,105 | 10/1962 | Moses | 43/16 |
| 3,187,456 | 6/1965 | Apitz | 43/17 |
| 3,199,241 | 8/1965 | Mauritz | 43/17 |
| 3,371,443 | 3/1968 | Dobson | 43/17 |
| 3,484,978 | 12/1969 | Nakashima | 43/17 |
| 3,530,611 | 9/1970 | Britt | 43/17 |
| 3,584,408 | 6/1971 | Frick | 43/17 |
| 3,641,693 | 2/1972 | Pinnow | 43/17 |
| 3,646,698 | 3/1972 | Zachae | 43/17 |
| 3,727,342 | 4/1973 | Lindsey, Jr. | 43/17 |
| 3,786,778 | 1/1974 | Palmer et al. | 43/17 |
| 3,807,078 | 4/1974 | Bartys | 43/17 |
| 3,962,812 | 6/1976 | Means et al. | 43/17 |
| 4,146,988 | 4/1979 | Bednarczyk | 43/17 |
| 4,285,154 | 8/1981 | Grahl | 43/17 |
| 4,520,586 | 6/1985 | Moisan | 43/17 |
| 4,571,876 | 2/1986 | LeClair | 43/17 |
| 4,573,281 | 3/1986 | Moisan | 43/17 |
| 4,685,240 | 8/1987 | Fralick | 43/17 |
| 4,905,398 | 3/1990 | Botbyl | 43/17 |
| 5,050,333 | 9/1991 | Debreczeni | 43/17 |
| 5,074,072 | 12/1991 | Serocki et al. | 43/17 |
| 5,101,591 | 4/1992 | Frazier et al. | 43/17 |
| 5,119,577 | 6/1992 | Lilly | 43/17 |
| 5,152,093 | 10/1992 | Bartys | 43/17 |
| 5,235,773 | 8/1993 | Rinehart | 43/17 |
| 5,269,088 | 12/1993 | Slaback, Jr. et al. | 43/17 |
| 5,339,558 | 8/1994 | Monsen | 43/17 |
| 5,448,850 | 9/1995 | Gonnello | 43/17 |
| 5,638,629 | 6/1997 | Robichaud et al. | 43/17 |
| 5,832,652 | 11/1998 | Bartys | 43/17 |

FOREIGN PATENT DOCUMENTS

| | | | |
|---|---|---|---|
| WO 94/15458 | 7/1994 | WIPO | 43/17 |
| WO 97/40666 | 11/1997 | WIPO | 43/17 |

*Primary Examiner*—Michael J. Carone
*Assistant Examiner*—Darren W. Ark
*Attorney, Agent, or Firm*—Kaardal & Associates, PC

[57] ABSTRACT

A fish bite indicator system includes a flag post having a flag attached to the post by a removable collar. The post is further attached to an elbow member by a coil. The elbow member is attachable to a pole of a fishing rod. The coil urges the post into a perpendicular orientation with respect to the pole. A retention assembly is provided for holding the post in a parallel orientation when in a set position. The fishing line passes through the retention assembly such that sufficient pull on the fishing line disengages the retention assembly such that the post returns to the perpendicular orientation. The fish bite indicating system is also usable without the retention assembly by retaining the post using the handle of a spinning reel. The elbow member is adjustably attachable to the pole using a bolt and nut holding a pair of rubber washers around the pole. A pair of metal washers are positioned around the rubber washers, one of the metal washers having a bent portion urging one of the rubber washers around the pole such that the pole is secured between the rubber washers.

15 Claims, 2 Drawing Sheets

FISH BITE INDICATOR SYSTEM

BACKGROUND OF THE INVENTION

1. Field of the Invention

The present invention relates to fishing bite indicators and more particularly pertains to a new fish bite indicator system for indicating the bite of a fish when fishing.

2. Description of the Prior Art

The use of fishing bite indicators is known in the prior art. More specifically, fishing bite indicators heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing bite indicators include U.S. Pat. Nos. 3,646,698; 4,146,988; 5,152,093; 3,727,342; 4,573,281; 3,962,812; PCT Patent WO 94/15458; and PCT Patent WO 97/40666.

While these devices fulfill their respective, particular objectives and requirements, the aforementioned patents do not disclose a new fish bite indicator system. The inventive device includes a spring biased flag pole and retention assembly for holding the flag in a set position prior to the bite of a fish.

In these respects, the fish bite indicator system according to the present invention substantially departs from the conventional concepts and designs of the prior art, and in so doing provides an apparatus primarily developed for indicating the bite of a fish when fishing.

SUMMARY OF THE INVENTION

In view of the foregoing disadvantages inherent in the known types of fishing bite indicators now present in the prior art, the present invention provides a new fish bite indicator system construction wherein the same can be utilized for indicating the bite of a fish when fishing.

The general purpose of the present invention, which will be described subsequently in greater detail, is to provide a new fish bite indicator system and method which has many of the advantages of the fishing bite indicators mentioned heretofore and many novel features that result in a new fish bite indicator system which is not anticipated, rendered obvious, suggested, or even implied by any of the prior art fishing bite indicators, either alone or in any combination thereof.

To attain this, the present invention generally comprises a spring biased flag pole and retention assembly for holding the flag in a set position prior to the bite of a fish.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the indicating the bite of a fish when fishing of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fish bite indicator system and method which has many of the advantages of the fishing bite indicators mentioned heretofore and many novel features that result in a new fish bite indicator system which is not anticipated, rendered obvious, suggested, or even implied by any of the prior art fishing bite indicators, either alone or in any combination thereof.

It is another object of the present invention to provide a new fish bite indicator system that may be easily and efficiently manufactured and marketed.

It is a further object of the present invention to provide a new fish bite indicator system that is of a durable and reliable construction.

An even further object of the present invention is to provide a new fish bite indicator system that is susceptible of a low cost of manufacture with regard to both materials and labor, and that accordingly is then susceptible of low prices of sale to the consuming public, thereby making such a fish bite indicator system economically available to the buying public.

Still yet another object of the present invention is to provide a new fish bite indicator system that provides in the apparatuses and methods of the prior art some of the advantages thereof, while simultaneously overcoming some of the disadvantages normally associated therewith.

Still another object of the present invention is to provide a new fish bite indicator system for indicating the bite of a fish when fishing.

Yet another object of the present invention is to provide a new fish bite indicator system which includes a spring biased flag pole and retention assembly for holding the flag in a set position prior to the bite of a fish.

Still yet another object of the present invention is to provide a new fish bite indicator system that gives a visual alert when the fishing line is pulled from the rod and reel.

Even still another object of the present invention is to provide a new fish bite indicator system that is adaptable for use with either a reel having a handle that spins when line is pulled and a reel that is stationary when line is pulled from the reel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
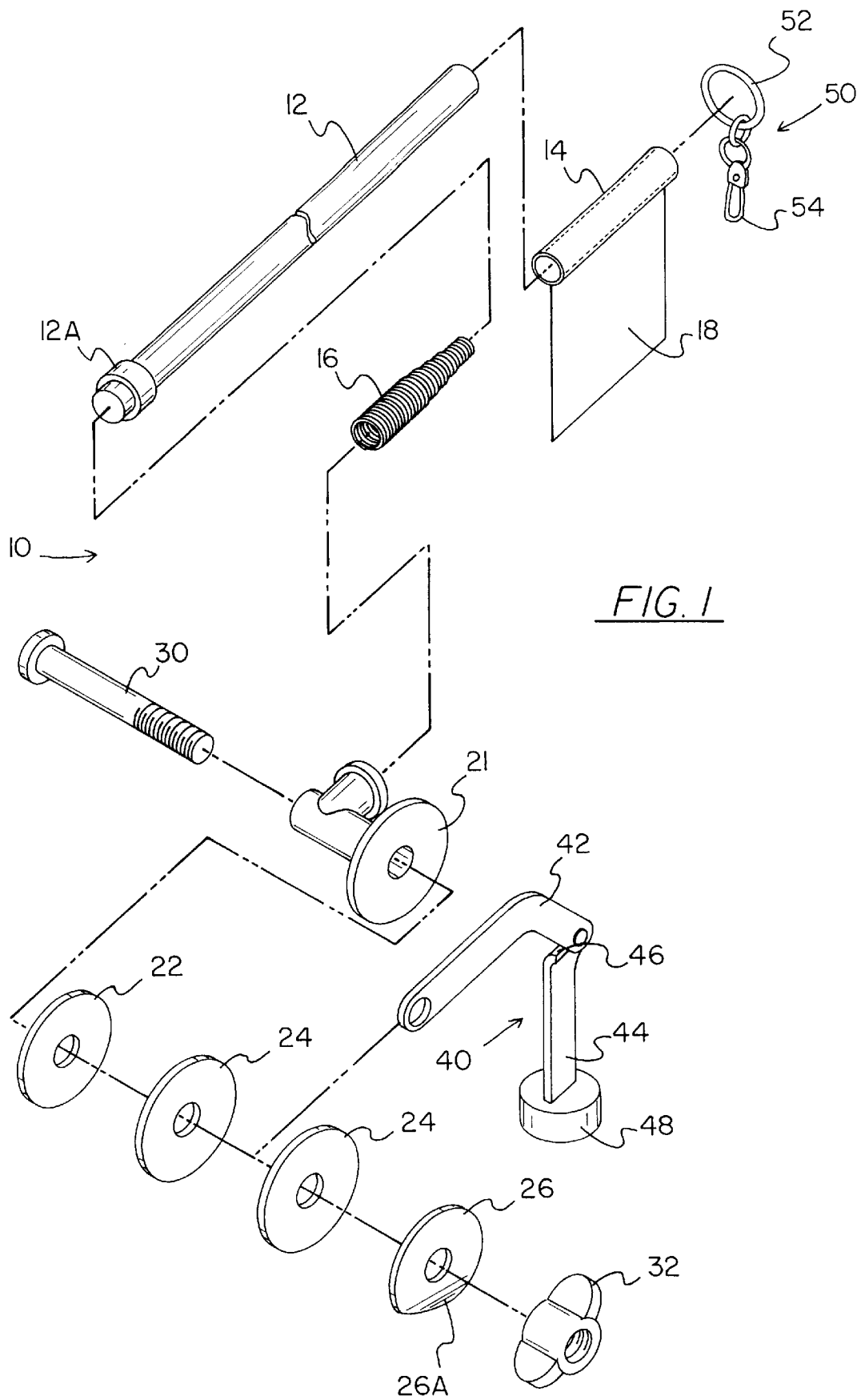
FIG. 1 is an exploded view of a new fish bite indicator system according to the present invention.

With reference now to the drawings, and in particular to FIGS. 1 through 4 thereof, a new fish bite indicator system embodying the principles and concepts of the present invention and generally designated by the reference numeral 10 will be described.

As best illustrated in FIGS. 1 through 4, the fish bite indicator system 10 comprises a post 12 having a flag 18 attached to a removable collar 14. The removable collar 14 is slidable onto the post 12. A coil 16 is positioned around an end of the post 12 opposite the collar 14; a second end of the coil 16 is coupled to an elbow member 21. Mounting means 20 designed for securing the elbow member 21 to the fishing pole member 3 are included such that the coil 16 biases the post 12 into a substantially perpendicular orientation with respect to the fishing pole.

The fish bite indicator system 10 further includes a post retention assembly 50 for holding the post 12 in a position substantially parallel with respect to the pole member 3 such that a loop 52 of the post retention assembly 50 is offset from aligned spaced apart rings 2 along the length of the fishing pole member 3. The post retention assembly 50 is designed for receiving a fishing line 6 running from the fishing pole such that the retention assembly 50 disengages the post 12 when the fishing line 6 is pulled away from the fishing rod by a biting fish whereby the coil 16 urges the post 12 into the perpendicular orientation with respect to the fishing rod.

The mounting means 20 is designed for securing the elbow member 21 to the fishing pole member 3 and includes a bore 21A through the elbow member 21 and a bolt 30 passing through the bore 21A.

The bolt 30 is inserted through a first metal washer 22 so that the metal washer is positioned adjacent the elbow member 21.

The bolt 30 is then inserted through the pair of rubber washers 24 such that a first one of the pair of rubber washers 24A is positioned adjacent the first metal washer 22. The bolt 30 is inserted through a second metal washer 26 having a bent portion 26A. The second metal washer 26 is positioned adjacent a second one of the pair of rubber washers, 24A and 24B, and the bent portion 26A is directed towards the second one of the pair of rubber washers 24B to bend the second one of the pair of washers 24B around the pole member 3. It is most preferred for rubber washer 24A to have a thickness greater than a thickness of rubber washer 24B.

The bolt 30 is secured by a nut 32 adjacent the second metal washer 26.

The pair of rubber washers 24 are positionable around the fishing pole member 3 prior to tightening of the nut 32 such that the bent portion 26A of the second metal washer 26 urges the second one of the pair of rubber washers 24 around the fishing pole member 3, whereby the elbow member 21 is secured to the fishing pole member 3 when the nut 32 is tightened.

The post retention assembly 50 further includes a clasp 54 designed for coupling to one of the spaced rings 2 on the fishing pole member 3. The loop 52 is coupled to the clasp 54 member for removably engaging a distal end of the post 12 proximate the collar 14 when the post 12 is placed in the parallel orientation with respect to the fishing pole member 3. The loop 52 is for holding the post 12 in the parallel position with respect to the fishing pole member 3 such that the loop 52 is offset from the aligned spaced rings 2 along the length of the fishing pole member 3.

Figure 3:
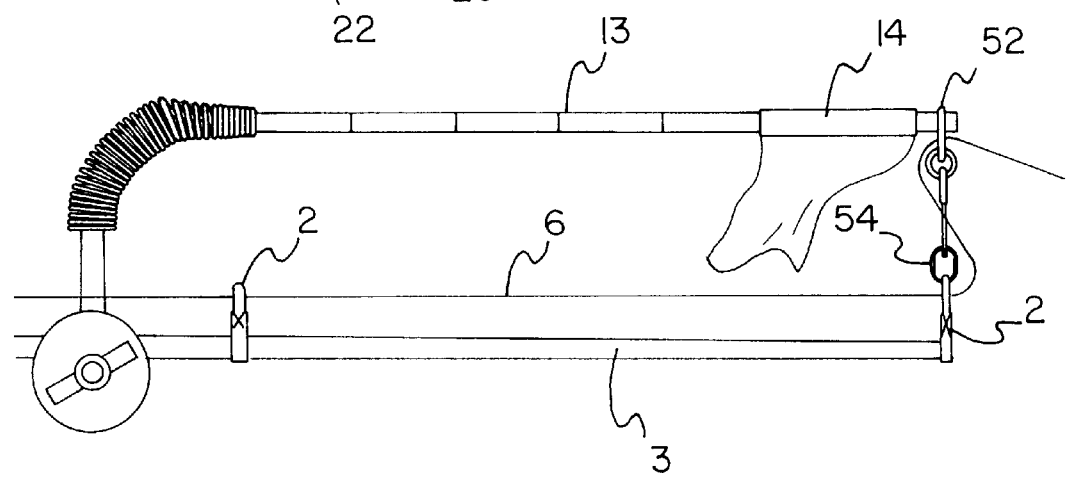
FIG. 3 is a side view of the present invention attached to an end of a fishing pole.

As best shown in FIG. 3, the loop 52 is also designed to receive the fishing line 6 with the fishing line 6 passing through the aligned spaced apart rings 2 such that the loop 52 disengages the post 12 when the fishing line 6 is urged away from the fishing rod by a biting fish whereby the coil 16 urges the post 12 into the perpendicular orientation.

The fish bite indicating system 10 also provides for simple replacement of the post 12 in the event that the post 12 breaks. The coil 16 tapers as it extends away from the elbow member 21. The coil 16 is selectively removable from the elbow member 21 because the post 12 is slidably insertable through the coil 16 when the coil 16 is removed from the elbow member 21 and the collar 14 is removed from the post 12. The post 12 further including a stopper 12A coupled to the post 12 to prevent the post 12 from passing entirely through the coil 16. The stopper 12A contacts the coil 16 whereby the post 12 extends a finite distance out of the coil 16.

The bolt 30 is insertable through an end of a stand 40, the stand 40 is positionable between the pair of rubber washers 24 whereby the stand 40 member is coupled to the means 20 designed for securing the elbow member 21 to the fishing pole member 3. The stand 40 includes a first leg 42 hingedly coupled to a second leg 44. The first leg 42 is coupled to the means 20 designed for securing the elbow member 21 to the fishing pole member 3. The second leg 44 includes a foot 48 at a distal end. The first leg 42 and the second leg 44 are each angled and the second leg 44 includes a protrusion 46 for selectively abutting the first leg 42 such that rotation of the first leg 42 around the second leg 44 is limited.

Figure 2:
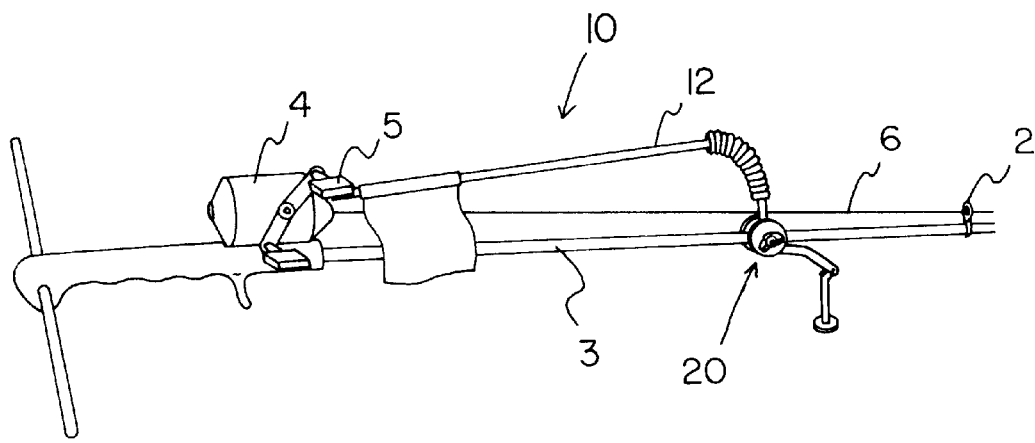
FIG. 2 is a perspective view of the present invention attached to a rod having a spinning reel.
Figure 4:
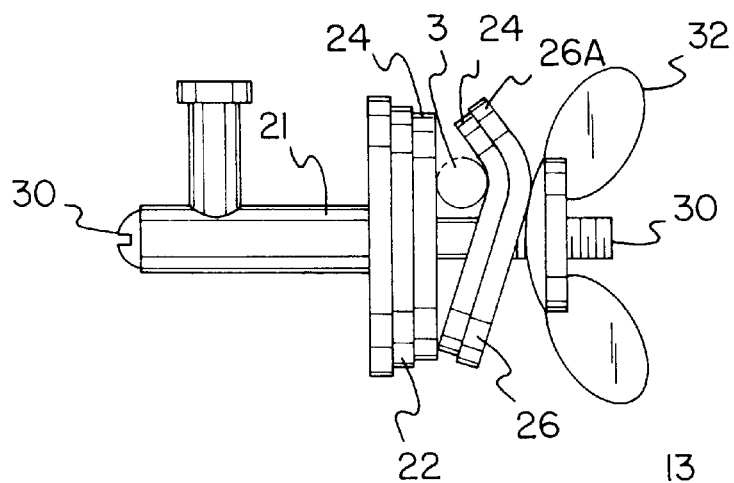
FIG. 4 is an end view of the mounting assembly of the present invention.

In use the fish bite indicator system 10 is attached to a fishing pole in one of two positions. On any type of fishing rod, the system 10 can be attached proximate a distal end of the fishing pole member 3, as best shown in FIG. 3. As shown in FIG. 2, for fishing rods using a spinning reel 4, the system 10 can be used without the post retention assembly 50. In place of the post retention assembly 50, the handle 5 of the spinning reel 4 can be positioned to retain the post 12 in the set position. As also shown in FIG. 2, the stand is employed in combination with an elongate member 66 extending through a hole in the handle of the fishing rod. Thus the stand and the elongate member provide a base for holding the fishing rod.

In a most preferred embodiment, the post can be constructed from a dowel rod and the stopper can be accomplished by wrapping a sufficient amount of tape around an end of the dowel rod. Thus the rod can easily and cheaply be replaced. In an alternate embodiment, a telescoping post 13, as shown in FIG. 3, can be used to provide a more compact device when not in use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fish bite indicating system for attachment to a fishing pole, the fishing pole including a pole member, aligned spaced rings coupled along the length of the pole member, and a reel, the fish bite indicating system comprising:

a post having a removable collar;

a flag being attached to said collar;

a coil, a first end of said coil being positioned around an end of said post opposite said collar, a second end of said coil being coupled to a mounting means adapted for securing said coil to the fishing pole member such that the coil biases the post into a substantially perpendicular orientation with respect to the fishing pole;

a post retention assembly for holding the post in a position substantially parallel with respect to the fishing pole such that the post retention assembly is offset from the aligned spaced apart rings along the length of the fishing pole member, the post retention assembly being adapted for receiving a fishing line running from the fishing pole such that the retention assembly disengages the post when the fishing line is pulled away from the fishing rod by a biting fish whereby the coil urges the post into said perpendicular orientation; and wherein the means adapted for securing the coil to the fishing pole member includes an elbow member having a bore and a bolt passing through a lumen of said bore, said elbow member being removably coupled to said coil;

a first metal washer, said bolt being inserted through said metal washer, the metal washer being positioned adjacent the elbow member;

a pair of rubber washers, said bolt being inserted through said pair of rubber washers, a first one of said pair of rubber washers being positioned adjacent said first metal washer;

a second metal washer, said second metal washer having a bent portion, said bolt being inserted through said second metal washer such that said second metal washer is positioned adjacent a second one of said pair of rubber washers, said bent portion being directed towards said second one of said pair of rubber washers;

a nut for coupling to said bolt adjacent the second metal washer;

wherein the pair of rubber washers are positionable around the fishing pole member prior to tightening of said nut such that the bent portion of the second metal washer urges the second one of the pair of rubber washers around the fishing pole member, whereby the elbow member is secured to the fishing pole member when the nut is tightened.

2. The fish bite indicating system of claim 1, wherein the post retention assembly further comprises:

a clasp member adapted for removably coupling to one of the spaced rings on the fishing pole member;

a loop member coupled to the clasp member, the loop member being for removably engaging a distal end of the post proximate the collar when the post is placed in the parallel position with respect to the fishing pole member, the loop member being for holding the fishing pole member in the parallel position such that the loop member is offset from the aligned spaced rings along the length of the fishing pole member;

wherein the loop member is adapted to receive the fishing line therethrough, the fishing line passing through the aligned spaced apart rings such that the loop member disengages the post when the fishing line is urged away from the fishing rod by a biting fish whereby the coil urges the post into said perpendicular orientation.

3. The fish bite indicating system of claim 1, further comprising:

the coil tapering as it extends away from the mounting means, the coil further being selectively removable from the mounting means;

the post being slidably insertable through the coil when the coil is removed from the mounting means and the collar is removed from the post, the post further including a stopper coupled to the post such that the stopper is positionable within the coil such that the post is prevented from passing entirely through the coil, whereby the post extends a finite distance out of the coil.

4. The fish bite indicating system of claim 1 further comprising:

a stand member, the bolt being insertable through an end of the stand member, the stand member being positionable between the pair of rubber washers whereby the stand member is coupled to the means adapted for securing the coil to the fishing pole member.

5. The fish bite indicating system of claim 4, wherein the stand member further includes a first leg and a second leg, the first leg being hingedly coupled to the second leg;

the first leg being coupled to the means adapted for securing the coil to the fishing pole member; and the second leg having a foot at a distal end.

6. The fish bite indicating system of claim 5, wherein the first leg and the second leg are each angled, the second leg including a protrusion for selectively abutting the first leg such that rotation of the first leg around the second leg is limited.

7. The fish bite indicating system of claim 1, wherein the post is telescopic.

8. A fish bite indicating system for attachment to a fishing pole, the fishing pole including a pole member, aligned spaced rings coupled along the length of the pole member, and a spinning reel, the reel having a handle, the fish bite indicating system comprising:

a post having a removable collar;

a flag being attached to said collar;

a coil, a first end of said coil being positioned around an end of said post opposite said collar, a second end of said coil being coupled to a mounting means adapted for securing said coil to the fishing pole member such that the coil biases the post into a substantially perpendicular orientation with respect to the fishing pole;

wherein the means adapted for securing said coil to the fishing pole member is adapted for positioning such that the post is selectively engageable to the handle of the spinning reel such that the post is held in a substantially parallel orientation with respect to the fishing pole member when the fishing line is substantially motionless, and wherein the handle of the spinning reel disengages the post when the fishing line is pulled away from the fishing pole by a biting fish whereby the coil urges the post into said perpendicular orientation; and wherein the means adapted for securing the coil to the fishing pole member includes
- an elbow member having a bore and a bolt passing through a lumen of said bore, the elbow member being removably coupled to the coil;
- a first metal washer, said bolt being inserted through said metal washer, the metal washer being positioned adjacent the elbow member;
- a pair of rubber washers, said bolt being inserted through said pair of rubber washers, a first one of said pair of rubber washers being positioned adjacent said first metal washer;
- a second metal washer, said second metal washer having a bent portion, said bolt being inserted through said second metal washer such that said second metal washer is positioned adjacent a second one of said pair of rubber washers, said bent portion being directed towards said second one of said pair of rubber washers;
- a nut for coupling to said bolt adjacent the second metal washer;
- wherein the pair of rubber washers are positionable around the fishing pole member prior to tightening of said nut such that the bent portion of the second metal washer urges the second one of the pair of rubber washers around the fishing pole member, whereby the elbow member is secured to the fishing pole member when the nut is tightened.

9. The fish bite indicating system of claim 8, further comprising:
- the coil tapering as it extends away from the elbow member, the coil further being selectively removable from the elbow member;
- the post being slidably insertable through the coil when the coil is removed from the elbow member and the collar is removed from the post, the post further including a stopper coupled to the post such that the stopper is positionable within the coil such that the post is prevented from passing entirely through the coil, whereby the post extends a finite distance out of the coil.

10. The fish bite indicating system of claim 8 further comprising:
- a stand member, the bolt being insertable through an end of the stand member, the stand member being positionable between the pair of rubber washers whereby the stand member is coupled to the means adapted for securing the coil to the fishing pole member.

11. The fish bite indicating system of claim 10, wherein the stand member further includes a first leg and a second leg, the first leg being hingedly coupled to the second leg;
- the first leg being coupled to the means adapted for securing the coil to the fishing pole member; and
- the second leg having a foot at a distal end.

12. The fish bite indicating system of claim 11, wherein the first leg and the second leg are each angled, the second leg including a protrusion for selectively abutting the first leg such that rotation of the first leg around the second leg is limited.

13. The fish bite indicating system of claim 8, wherein the post is telescopic.

14. A fish bite indicating system for attachment to a fishing pole, the fishing pole including a pole member, aligned spaced rings coupled along the length of the pole member, and a reel, the fish bite indicating system comprising:

a post having a removable collar;

a flag being attached to said collar;

a coil, a first end of said coil being positioned around an end of said post opposite said collar, a second end of said coil being coupled to a mounting means adapted for securing said coil to the fishing pole member such that the coil biases the post into a substantially perpendicular orientation with respect to the fishing pole;

a post retention assembly for holding the post in a position substantially parallel with respect to the fishing pole such that the post retention assembly is offset from the aligned spaced apart rings along the length of the fishing pole member, the post retention assembly being adapted for receiving a fishing line running from the fishing pole such that the retention assembly disengages the post when the fishing line is pulled away from the fishing pole by a biting fish whereby the coil urges the post into said perpendicular orientation;

wherein the means adapted for securing the coil to the fishing pole member includes
- an elbow member having a bore and a bolt passing through a lumen of said bore, the elbow member being removably coupled to the coil,
- a first metal washer, said bolt being inserted through said metal washer, the metal washer being positioned adjacent the elbow member,
- a pair of rubber washers, said bolt being inserted through said pair of rubber washers, a first one of said pair of rubber washers being positioned adjacent said first metal washer,
- a second metal washer, said second metal washer having a bent portion, said bolt being inserted through said second metal washer such that said second metal washer is positioned adjacent a second one of said pair of rubber washers, said bent portion being directed towards said second one of said pair of rubber washers,
- a nut for coupling to said bolt adjacent the second metal washer,
- wherein the pair of rubber washers are positionable around the fishing pole member prior to tightening of said nut such that the bent portion of the second metal washer urges the second one of the pair of rubber washers around the fishing pole member, whereby the mounting means is secured to the fishing pole member when the nut is tightened;

wherein the post retention assembly further includes
- a clasp member adapted for coupling to one of the spaced rings on the fishing pole member, a loop member coupled to the clasp member, the loop member being for removably engaging a distal end of the post proximate the collar when the post is placed in the parallel position with respect to the fishing pole member, the loop being for holding the fishing pole member in the parallel position such that the loop is offset from the aligned spaced rings along the length of the fishing pole member, and wherein the loop is adapted to receive the fishing line therethrough, the fishing line passing through the aligned spaced apart rings such that the loop disengages the post when the fishing line is urged away from the fishing pole by a biting fish whereby the coil urges the post into said perpendicular orientation;

the coil tapering as it extends away from the elbow member;

the post being slidably insertable through the coil when the coil is removed from the elbow member and the collar is removed from the post, the post further including a stopper coupled to the post such that the stopper is positionable within the coil such that the post is prevented from passing entirely through the coil, whereby the post extends a finite distance out of the coil;

a stand member, the bolt being insertable through an end of the stand member, the end of the stand member being positionable between the pair of rubber washers whereby the stand member is coupled to the means adapted for securing the coil to the fishing pole member;

wherein the stand member further includes a first leg and a second leg, the first leg being hingedly coupled to the second leg;

the first leg being coupled to the means adapted for securing the coil to the fishing pole member;

the second leg having a foot at a distal end; and wherein the first leg and the second leg are each angled, the second leg including a protrusion for selectively abutting the first leg such that rotation of the first leg around the second leg is limited.

15. The fish bite indicating system of claim 14, wherein the post is telescopic.

\* \* \* \* \*